(12) United States Patent
Tang et al.

(10) Patent No.: US 12,100,435 B2
(45) Date of Patent: Sep. 24, 2024

(54) DATA READING AND WRITING APPARATUSES AND DATA READING AND WRITING METHODS

(71) Applicant: HUAWEI TECHNOLOGIES CO., LTD., Guangdong (CN)

(72) Inventors: Hongwei Tang, Hangzhou (CN); Jun Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/994,618

(22) Filed: Nov. 28, 2022

(65) Prior Publication Data

US 2023/0097007 A1 Mar. 30, 2023

Related U.S. Application Data

(63) Continuation of application No. PCT/CN2021/095325, filed on May 21, 2021.

(30) Foreign Application Priority Data

May 29, 2020 (CN) .......................... 202010476383.5

(51) Int. Cl.
G11B 7/0045 (2006.01)
G11B 7/005 (2006.01)
G11B 7/128 (2012.01)

(52) U.S. Cl.
CPC .......... *G11B 7/00456* (2013.01); *G11B 7/005* (2013.01); *G11B 7/128* (2013.01)

(58) Field of Classification Search
None
See application file for complete search history.

(56) References Cited

U.S. PATENT DOCUMENTS 4,393,387 A * 7/1983 Kitamura ............. H04N 1/1916
  347/240
5,353,273 A * 10/1994 Zavislan ................ G11B 7/124
(Continued)

FOREIGN PATENT DOCUMENTS

CN 1191034 A 8/1998
CN 103874962 A 6/2014
(Continued)

OTHER PUBLICATIONS

English text of Tsukagoshi et al., JP 2005-265977A, published Sep. 29, 2005 (Year: 2005).*

(Continued)

*Primary Examiner* — Peter Vincent Agustin

(57) ABSTRACT

Data reading and writing apparatuses and data reading and writing methods are provided. In a data reading apparatus or a data writing apparatus, an optical head array including a plurality of laser heads is disposed, so that a quantity of laser heads for reading/writing data is increased. In addition, each laser head is improved, and a plurality of focal points are disposed in the laser head, so that in a data reading/writing process, parallel reading/writing of a plurality of pieces of data may be implemented by using the plurality of laser heads and the plurality of focal points in the laser head, and a data read/write throughput of an optical storage medium may be improved.

13 Claims, 15 Drawing Sheets

(56) References Cited

U.S. PATENT DOCUMENTS

| | | | |
|---|---|---|---|
| 5,479,384 A | 12/1995 | Toth et al. | |
| 5,483,511 A * | 1/1996 | Jewell | G11B 7/14 |
| | | | 369/44.37 |
| 5,592,444 A * | 1/1997 | Alon | G11B 7/127 |
| 6,061,526 A * | 5/2000 | Deguchi | H04N 1/506 |
| | | | 396/89 |
| 6,373,809 B1 | 4/2002 | Rauch et al. | |
| 10,181,336 B1 | 1/2019 | Georgiou et al. | |
| 2002/0110077 A1* | 8/2002 | Drobot | G11B 7/124 |
| 2004/0184384 A1* | 9/2004 | Spoonhower | G11B 7/127 |
| 2005/0105444 A1* | 5/2005 | Ito | G11B 7/14 |
| | | | 369/44.37 |
| 2006/0092784 A1 | 5/2006 | Anderson et al. | |
| 2007/0030790 A1* | 2/2007 | Hendriks | G11B 7/24 |
| | | | 369/120 |
| 2009/0003153 A1 | 1/2009 | Yamatsu | |
| 2011/0242958 A1 | 10/2011 | Shi et al. | |
| 2023/0097007 A1* | 3/2023 | Tang | G11B 7/005 |
| | | | 360/77.03 |

FOREIGN PATENT DOCUMENTS

| | | |
|---|---|---|
| JP | S62109241 A | 5/1987 |
| JP | H05189800 A | 7/1993 |
| JP | 2002032925 A | 1/2002 |
| JP | 2002157746 A | 5/2002 |
| JP | 2005265977 A | 9/2005 |
| JP | 2008059668 A | 3/2008 |
| JP | 2010205346 A | 9/2010 |
| WO | 2007039372 A1 | 4/2007 |

OTHER PUBLICATIONS

Office Action issued in KR2022-7045512, dated Nov. 30, 2023 with English translation, 14 pages.
International Search Report and Written Opinion issued in PCT/CN2021/095325, dated Aug. 2, 2021, 10 pages.
Extended European Search Report issued in EP21811778.6, dated Oct. 12, 2023, 16 pages.
Office Action issued in JP2022-573375, dated Dec. 4, 2023, with English Translation, 17 pages.

* cited by examiner

DATA READING AND WRITING APPARATUSES AND DATA READING AND WRITING METHODS

CROSS-REFERENCE TO RELATED APPLICATIONS

This application is a continuation of International Application No. PCT/CN2021/095325, filed on May 21, 2021, which claims priority to Chinese Patent Application No. 202010476383.5, filed on May 29, 2020. The disclosures of the aforementioned applications are hereby incorporated by reference in their entireties.

TECHNICAL FIELD

This application relates to the field of storage technologies, and in particular, to data reading and writing apparatuses and data reading and writing methods.

BACKGROUND

Optical storage is a common data storage manner. A main principle of optical storage is to store data by using changes of parameters such as a frequency, polarization, and a refractive index of light and interaction between photons and matter. In an optical storage technology, a common data reading/writing manner is as follows: A rotating spindle is used to drive an optical storage medium to rotate at a high speed, and then a laser head for reading/writing data is used to read or write data from or into the optical storage medium.

However, as a volume of data stored in the optical storage medium becomes increasingly larger, to meet the requirement of fast data reading/writing, a data read/write throughput of the optical storage medium needs to be improved.

SUMMARY

This application provides data reading and writing apparatuses and data reading and writing methods, to improve a data read/write throughput of an optical storage medium.

According to a first aspect, a data reading apparatus is provided. The data reading apparatus includes an optical signal generator, an optical head array, and a processing module. The optical signal generator is configured to generate an optical signal, and then send the optical signal to the optical head array. The optical head array includes a plurality of laser heads, and each laser head includes a plurality of focal points. The plurality of laser heads is configured to receive the optical signal generated by the optical signal generator, and apply the received optical signal to a plurality of data points of an optical storage medium by using the plurality of focal points of each laser head, to obtain a plurality of data signals. The processing module is configured to receive the plurality of data signals, and process the plurality of data signals to obtain read data.

In the foregoing data reading apparatus, the optical head array including the plurality of laser heads is disposed, so that a quantity of laser heads for reading data may be increased. In addition, the plurality of focal points is disposed in each laser head, so that in one data reading process, parallel reading of a plurality of pieces of data may be implemented by using the plurality of laser heads and the plurality of focal points, and a data read throughput of the optical storage medium may be improved.

In a possible design, the plurality of laser heads includes m rows×n columns, where a product of m and n is not less than 2.

In the foregoing data reading apparatus, the plurality of laser heads may be arranged in one row and a plurality of columns, or may be arranged in a plurality of rows and a plurality of columns, or may be arranged in a plurality of rows and one column, so that flexibility of the data reading apparatus may be increased.

In a possible design, a shape of the optical storage medium includes a rectangle.

In the foregoing data reading apparatus, the shape of the optical storage medium may not be limited to a circle, for example, may include a polygon, for example, a rectangle or a triangle.

In a possible design, the data reading apparatus further includes a motion platform and a motion controller. The motion platform is configured to place the optical storage medium. The motion controller is connected to the motion platform, and is configured to control, based on a storage address of the read data, the optical storage medium to move in a first direction on a plane on which the optical storage medium is located, or move in a second direction perpendicular to the first direction.

In the foregoing data reading apparatus, the motion controller no longer controls the optical storage medium to perform rotational motion, but controls the optical storage medium to move in the first direction or the second direction perpendicular to the first direction on the plane on which the optical storage medium is located, so that complexity of controlling motion of the optical storage medium by the motion controller may be reduced, and realizability of the motion controller may be increased.

In a possible design, the processing module includes a plurality of detectors and a processor. Each of the plurality of detectors is configured to detect one data signal obtained by one laser head. The processor is connected to the plurality of detectors, and is configured to obtain the data signal detected by each detector, and process the data signal detected by each detector, to obtain the read data.

In the foregoing data reading apparatus, a combination of the detectors and the processor may be used to implement data signal collection and processing, so that an implementation is simple, and complexity of the data reading apparatus may be reduced.

In a possible design, the optical signal generated by the optical signal generator is a continuous laser signal.

According to a second aspect, a data writing apparatus is provided. The data writing apparatus includes an optical signal generator, a plurality of optical modulators, and an optical head array. The optical signal generator is configured to generate an optical signal, and then send the generated optical signal to the plurality of optical modulators. Each of the plurality of optical modulators is configured to receive the optical signal, modulate the received optical signal based on to-be-stored data to obtain a plurality of modulated signals, and send the plurality of modulated signals to the optical head array. The optical head array includes a plurality of laser heads, and each laser head includes a plurality of focal points. The plurality of laser heads is configured to receive a plurality of modulated signals sent by the plurality of optical modulators, and respectively control on/off of a plurality of corresponding focal points based on the received plurality of modulated signals, to write the to-be-stored data in parallel into an optical storage medium. One laser head receives a plurality of modulated signals sent by one optical modulator.

In the foregoing data writing apparatus, the optical head array including the plurality of laser heads is disposed, so that a quantity of laser heads for writing data may be increased. In addition, the plurality of focal points is disposed in each laser head, so that in one data writing process, parallel writing of a plurality of pieces of data may be implemented by using the plurality of laser heads and the plurality of focal points, and a data write throughput of the optical storage medium may be improved.

In a possible design, the plurality of laser heads includes m rows×n columns, where a product of m and n is not less than 2.

In a possible design, the plurality of focal points of each laser head is located in a same row, and on/off control of each focal point is independent.

In the foregoing data writing apparatus, the on/off control of each focal point in the optical head array may be independent. For example, at a specific moment, some of a plurality of focal points in a laser head may be in an on state, the others may be in an off state, and on/off states of the plurality of focal points do not affect each other. Therefore, data may be written into the optical storage medium by controlling the on/off states of the plurality of focal points.

In a possible design, a shape of the optical storage medium includes a rectangle.

In a possible design, the data writing apparatus further includes a motion platform and a motion controller. The motion platform is configured to place the optical storage medium. The motion controller is connected to the motion platform, and is configured to control, based on a storage address corresponding to the to-be-stored data, the optical storage medium to move in a first direction on a plane on which the optical storage medium is located, or move in a second direction perpendicular to the first direction.

In a possible design, the optical signal generated by the optical signal generator is a pulsed laser signal.

According to a third aspect, a data reading method is provided. The data reading method is performed by a data reading apparatus. The data reading apparatus includes an optical signal generator, an optical head array, and a processing module. The data reading method includes: The optical signal generator generates an optical signal, and then sends the generated optical signal to the optical head array. The optical head array includes a plurality of laser heads, and each laser head includes a plurality of focal points. After receiving the optical signal, the plurality of laser heads applies the optical signal to a plurality of data points of an optical storage medium by using the plurality of focal points of each laser head, to obtain a plurality of data signals. The processing module receives the plurality of data signals, and processes the plurality of data signals to obtain read data.

In a possible design, the data reading apparatus further includes a motion platform and a motion controller. The motion platform is configured to place the optical storage medium. The motion controller may control, based on a storage address of the data, the optical storage medium to move in a first direction or a second direction on a plane on which the optical storage medium is located. The first direction is perpendicular to the second direction.

In a possible design, the processing module in the data reading apparatus includes a plurality of detectors and a processor. Each detector detects one data signal obtained by one laser head. Then, the processor obtains the data signal detected by each detector, and processes the data signal detected by each detector, to obtain the data.

According to a fourth aspect, a data writing method is provided. The data writing method is performed by a data writing apparatus. The data writing apparatus includes an optical signal generator, a plurality of optical modulators, and an optical head array. The data writing method includes: The optical signal generator generates an optical signal, and then sends the optical signal to the plurality of optical modulators. Each of the plurality of optical modulators receives the optical signal, modulates the optical signal based on to-be-stored data to obtain a plurality of modulated signals, and sends the plurality of modulated signals to the optical head array. The optical head array includes a plurality of laser heads, and each laser head includes a plurality of focal points. The plurality of laser heads receives a plurality of modulated signals sent by the plurality of optical modulators, and respectively controls on/off of a plurality of corresponding focal points based on the received plurality of modulated signals, to write the to-be-stored data in parallel into an optical storage medium. One laser head receives a plurality of modulated signals sent by one optical modulator.

In a possible design, the data writing apparatus further includes a motion platform and a motion controller. The motion platform is configured to place the optical storage medium. The motion controller may control, based on a storage address corresponding to the to-be-stored data, the optical storage medium to move in a first direction or a second direction on a plane on which the optical storage medium is located. The first direction is perpendicular to the second direction. For the second aspect to the fourth aspect and beneficial effects of implementations of the second aspect to the fourth aspect, refer to the descriptions of the apparatus of the first aspect and the beneficial effects of the implementations of the apparatus.

DESCRIPTION OF EMBODIMENTS

To make objectives, technical solutions, and advantages of embodiments of this application clearer, the following further describes embodiments of this application in detail with reference to accompanying drawings.

For ease of description, the following describes technical terms used in this application.

(1) Optical storage medium: is a storage medium in which information is stored by irradiating the medium with laser light, so that a physical property of the storage medium is changed due to interaction between the laser light and the medium. For example, the optical storage medium may include a conventional digital versatile disc (DVD), a Blu-ray disc (BD), or the like. This is not limited herein.

(2) Focal point: is disposed in each laser head. Laser light received by the laser head is applied to the optical storage medium by using the focal point.

(3) Data point: is a position that is in the optical storage medium and at which the physical property of the optical storage medium is changed due to irradiation of laser light.

(4) In the embodiments of this application, "a plurality of" means two or more. In view of this, in the embodiments of this application, "a plurality of" may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship between associated objects and represents that any one of three relationships may exist. For example, A and/or B may represent any of the following three cases: Only A exists, both A and B exist, or only B exists. In addition, unless otherwise specified, the character "/" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

To help a person skilled in the art understand the technical solutions of this application, the following describes a related technology used in this application.

Figure 1:
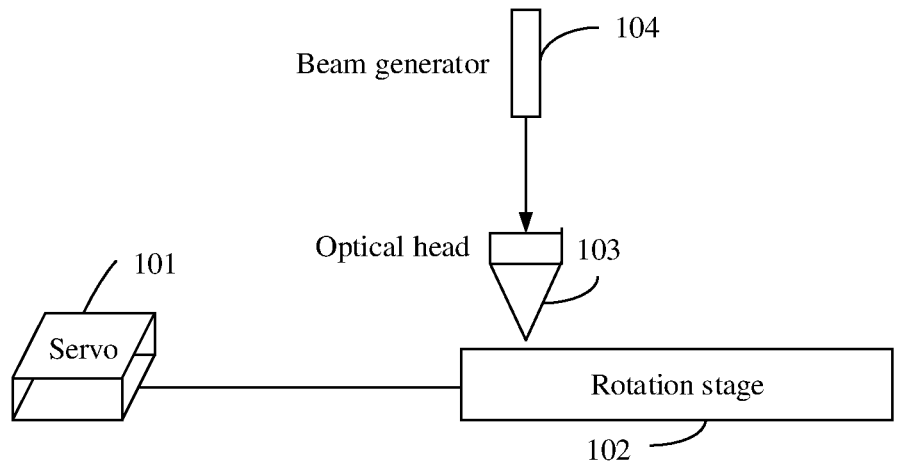
FIG. 1 is a schematic diagram of an example of a data reading/writing apparatus for an optical storage medium in a related technology.

FIG. 1 is a schematic diagram of an example of a data reading/writing apparatus 100 for an optical storage medium. As shown in FIG. 1, the apparatus 100 includes a servo 101, a rotation stage 102, an optical head 103, and a beam generator 104: and is configured to perform data reading/writing on a circular optical storage medium. The servo 101 is connected to the rotation stage 102. The rotation stage 102 is configured to place the circular optical storage medium. The servo 101 is configured to control the rotation stage 102 to rotate, so that the circular optical storage medium placed on the rotation stage 102 is rotated on a horizontal plane at a preset rate. The optical head 103 is disposed above the rotation stage 102, and is configured to apply a laser beam generated by the beam generator 104 to the circular optical storage medium by using a focal point of the optical head 103, to store data by changing a physical property of the circular optical storage medium by using the laser beam. For example, a concave-convex data point is generated on a surface of the optical storage medium, and the concave-convex data point may represent data 0 or data 1. During data reading, a reflected beam that is of a laser beam generated by the beam generator 104 and that is from the optical storage medium is read by using the focal point of the optical head 103, and data stored in the optical storage medium is obtained by using the reflected beam.

However, as a volume of data stored in the optical storage medium becomes increasingly larger, if a data read/write throughput of the data reading/writing apparatus for the optical storage medium is very low, a relatively long time is required when a large amount of data needs to be read or stored. Therefore, to meet a requirement of fast data reading/writing, the data read/write throughput of the optical storage medium needs to be improved. It may be understood that the data read/write throughput refers to a volume of data that is read or written in a unit time.

In view of this, the embodiments of this application provide a data reading apparatus and a data writing apparatus. In each apparatus, an optical head array including a plurality of laser heads is disposed, so that a quantity of laser heads for reading/writing data is increased. In addition, each laser head is improved, and a plurality of focal points are disposed in each laser head, so that in one data reading/writing process, parallel reading/writing of a plurality of pieces of data may be implemented by using the plurality of laser heads and the plurality of focal points in the laser head, and a data read/write throughput of the optical storage medium may be improved.

With reference to the accompanying drawings, the following separately describes the data reading apparatus and the data writing apparatus that are provided in the embodiments of this application.

Figure 2:
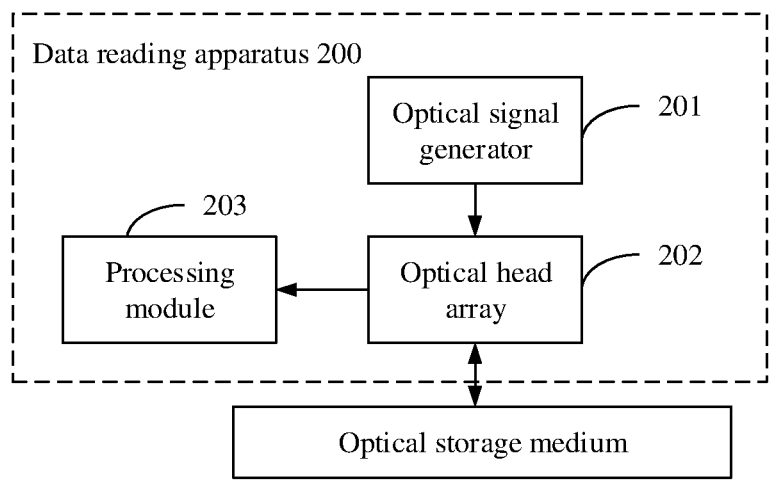
FIG. 2 is a schematic diagram of a structure of an example of a data reading apparatus according to an embodiment of this application.

FIG. 2 is a schematic diagram of a structure of a data reading apparatus 200 according to an embodiment of this application. As shown in FIG. 2, the data reading apparatus 200 includes an optical signal generator 201, an optical head array 202, and a processing module 203. The optical signal generator 201 is configured to generate an optical signal, and output the optical signal to the optical head array 202. After receiving the optical signal, the optical head array 202 applies the optical signal to a plurality of data points of an optical storage medium by using a plurality of focal points of each optical head in the optical head array 202. The data points in the optical storage medium provide feedback on the optical signal applied to the data points, so that the plurality of focal points receives a plurality of feedback signals. The feedback signal is a data signal corresponding to each data point. That is, a plurality of data signals is obtained. After receiving the plurality of data signals obtained by the optical head array 202, the processing module 203 processes the plurality of data signals, to finally obtain read data. It should be noted that the feedback signal may be a reflected signal that is of the optical signal applied to the data point and that is from the optical storage medium, or may be a specific fluorescent signal generated when the optical signal is applied to the optical storage medium, or may be another feedback signal. This is not limited in this embodiment of this application.

The foregoing briefly describes functions of the modules of the data reading apparatus 200, and the following describes the modules in detail.

(1) Optical Head Array 202

In this embodiment, the optical head array 202 includes a plurality of laser heads. A quantity of the plurality of laser heads may be determined based on factors such as energy of laser light that can be generated by the optical signal generator 201, a volume of the optical storage medium, and a volume of each laser head. This is not limited herein.

Figure 3A:
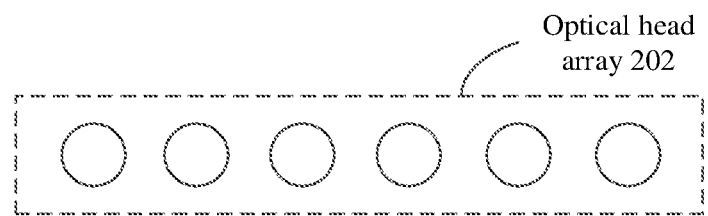
FIG. 3A to FIG. 3C are schematic diagrams of an arrangement manner of an optical head array according to an embodiment of this application.
Figure 3B:
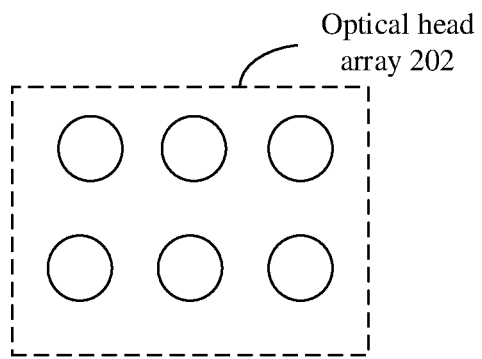
Figure 3C:
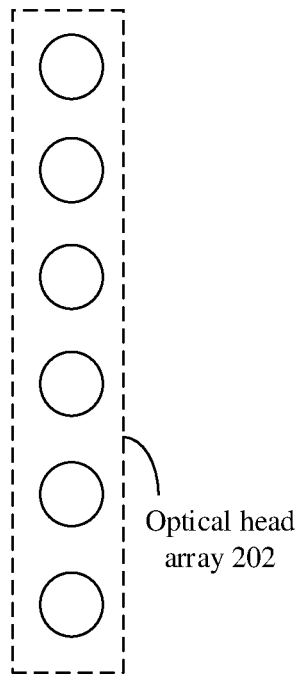

In an example, the plurality of laser heads includes m rows×n columns, where a product of m and n is not less than 2. It may be understood that the plurality of laser heads are arranged in an array. FIG. 3A to FIG. 3C are schematic diagrams of three examples of array arrangement of a plurality of laser heads. In FIG. 3A to FIG. 3C, an example in which the optical head array 202 includes six laser heads is used, and one laser head is represented by one circle in the figure. The plurality of laser heads may be arranged in one row and a plurality of columns. For example, in FIG. 3A, the plurality of laser heads are arranged in one row and six columns. The plurality of laser heads may alternatively be arranged in a plurality of rows and a plurality of columns. For example, in FIG. 3B, the plurality of laser heads is arranged in two rows and three columns. The plurality of laser heads may alternatively be arranged in a plurality of rows and one column. For example, in FIG. 3C, the plurality of laser heads are arranged in six rows and one column. Certainly, the plurality of laser heads may alternatively be arranged in another manner. This is not limited herein.

It should be noted that, in FIG. 3A to FIG. 3C, one laser head is represented by one circle, and the circle is not used to indicate a projection shape of each laser head on a plane on which the optical storage medium is located. That is, the projection shape of the laser head may be a circle, an ellipse, a rectangle, or the like. This is not limited herein.

Figure 4A:
FIG. 4A and FIG. 4B are schematic diagrams of an arrangement manner of a plurality of focal points included in each laser head in an optical head array according to an embodiment of this application.
Figure 4B:
Figure 4B:

Each laser head in the optical head array 202 includes a plurality of focal points, and each focal point may read data corresponding to one data point in the optical storage medium. In an example, a quantity of the plurality of focal points included in each laser head and an arrangement manner of the plurality of focal points in the laser head are the same. For example, each laser head may include six focal points, and the six focal points may be arranged in one row and six columns in one laser head, as shown in FIG. 4A. For another example, the six focal points may be arranged in two rows and three columns in one laser head, as shown in FIG. 4B. In this embodiment, the arrangement manner of the plurality of focal points included in each laser head is not limited. In FIG. 4A and FIG. 4B, a focal point is represented by "x".

Because each focal point needs to read data corresponding to one data point of the optical storage medium, density of the plurality of focal points included in the laser head needs to match density of the data points of the optical storage medium.

In a first example, density of a plurality of focal points included in one laser head is the same as the density of the data points of the optical storage medium. That is, an interval between two adjacent focal points is the same as an interval between adjacent data points in the optical storage medium.

In a second example, density of a plurality of focal points included in one laser head is an integer multiple of the density of the data points of the optical storage medium. That is, an interval between two adjacent focal points is an integer multiple of an interval between adjacent data points in the optical storage medium. For example, the density of the plurality of focal points is twice or three times the density of the data points. A person skilled in the art may set the density based on an actual situation.

In addition, to facilitate control of the plurality of laser heads included in the optical head array 202, the optical head array 202 may be disposed in an integrated optical disc drive, and a driving process of the optical head array 202 may be implemented by using the integrated optical disc drive.

(2) Optical Signal Generator 201

Figure 5:
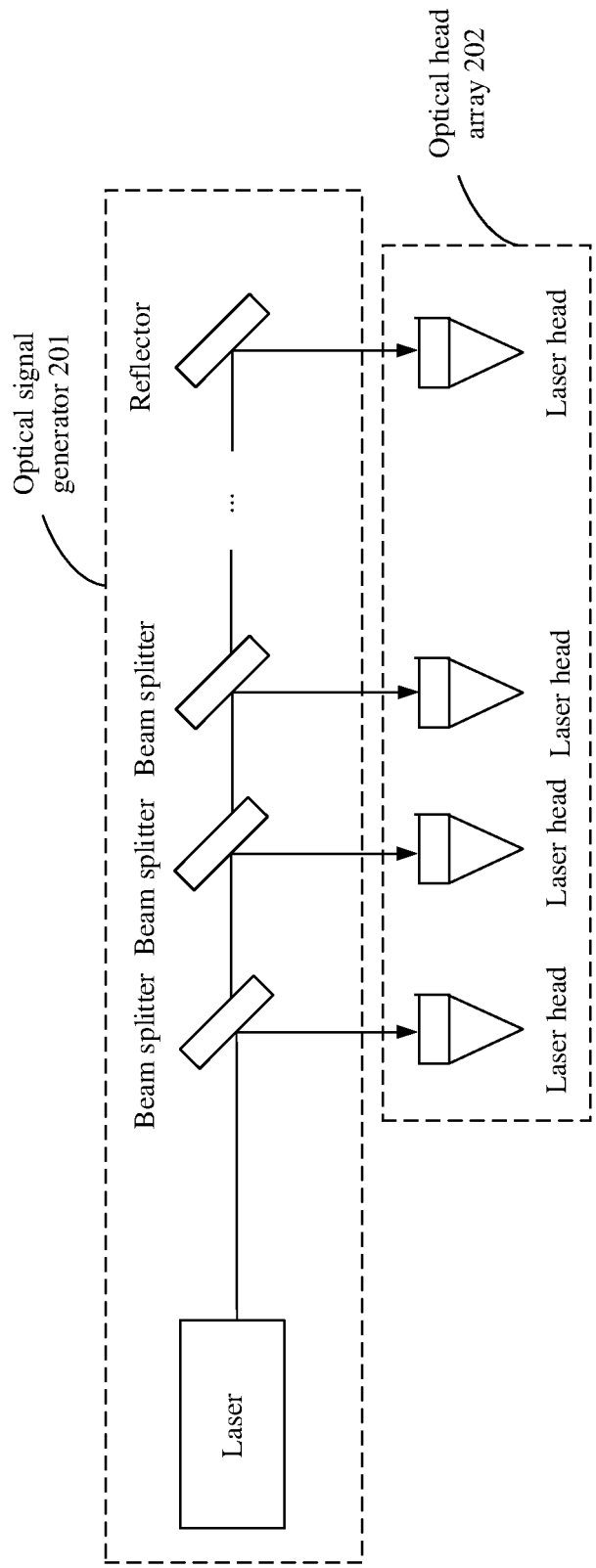
FIG. 5 is a schematic diagram of a structure of an example of an optical signal generator according to an embodiment of this application.

In an example, referring to FIG. 5, the optical signal generator 201 may include a laser, a beam splitter, and a reflector. The laser is configured to generate laser light. Then, the laser light generated by the laser is divided into a plurality of beams of sub laser light with equal energy by using the plurality of beam splitters. Therefore, each beam of sub laser light is sent to one of the laser heads in the optical head array 202, and the beam of sub laser light is applied to a data point of the optical storage medium by using each focal point of the laser head. The optical storage medium provides feedback on the sub laser light, so that each laser head obtains a feedback signal that is of the sub laser light and that is from the corresponding data point. The feedback signal is a data signal corresponding to the data point.

Quantities of the plurality of beam splitters and a plurality of reflectors are determined based on the quantity of the plurality of laser heads included in the optical head array 202. In the optical signal generator 201 shown in FIG. 5, an example in which the optical head array 202 includes eight optical heads is used. In this case, the laser light generated by the laser may be equally divided into eight beams of sub laser light with same energy by using seven beam splitters and one reflector. The seven beam splitters and the one reflector each correspond to one laser head in the optical head array 202. A split ratio of a first beam splitter is 7:1, a split ratio of a second beam splitter is 6:1, and so on, and a split ratio of a seventh beam splitter is 1:1. When the quantity of laser heads is another value, the same manner is used for setting, which is not described herein.

Figure 6:
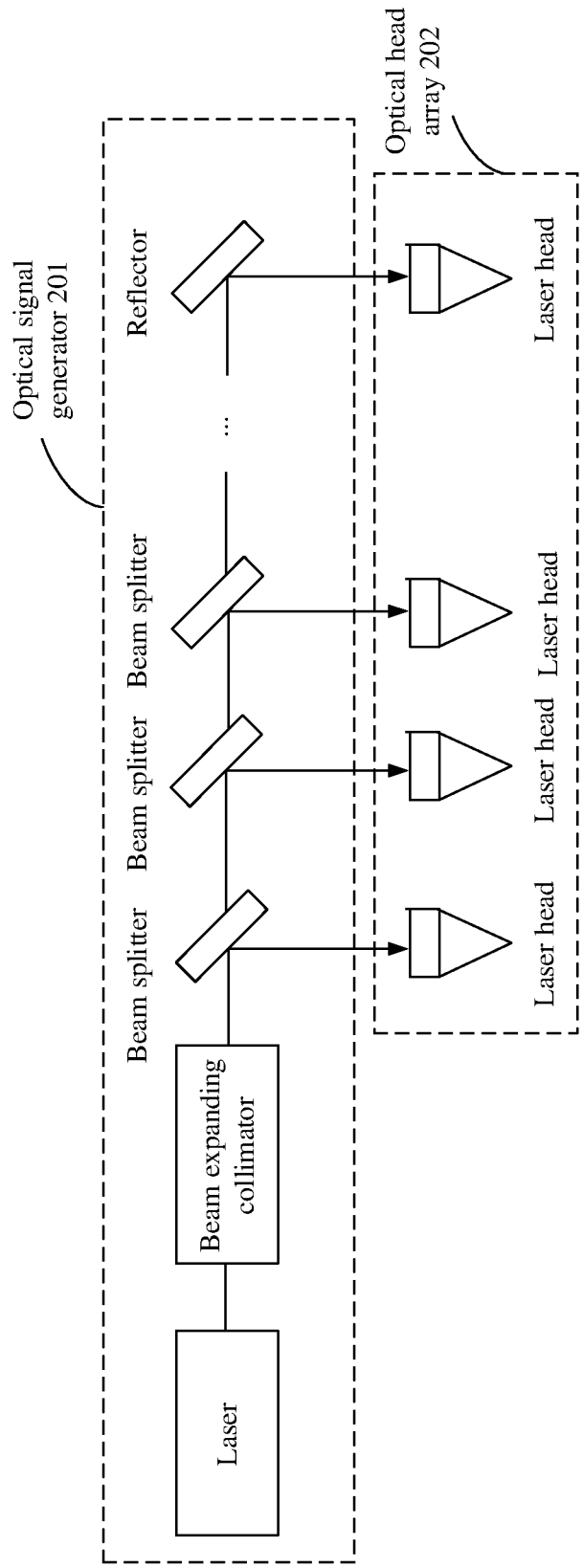
FIG. 6 is a schematic diagram of a structure of another example of an optical signal generator according to an embodiment of this application.

In another example, referring to FIG. 6, in addition to the laser, the beam splitter, and the reflector, the optical signal generator 201 may further include a beam expanding collimator. A light emitting area of the laser light generated by the laser is increased by using the beam expanding collimator, and then laser light obtained after the light emitting area is expanded is split by using the beam splitter and the reflector. A manner in which the laser light is split by using the beam splitter and the reflector is similar to the manner in the example shown in FIG. 5. Details are not described herein.

(3) Processing Module 203

Figure 7:
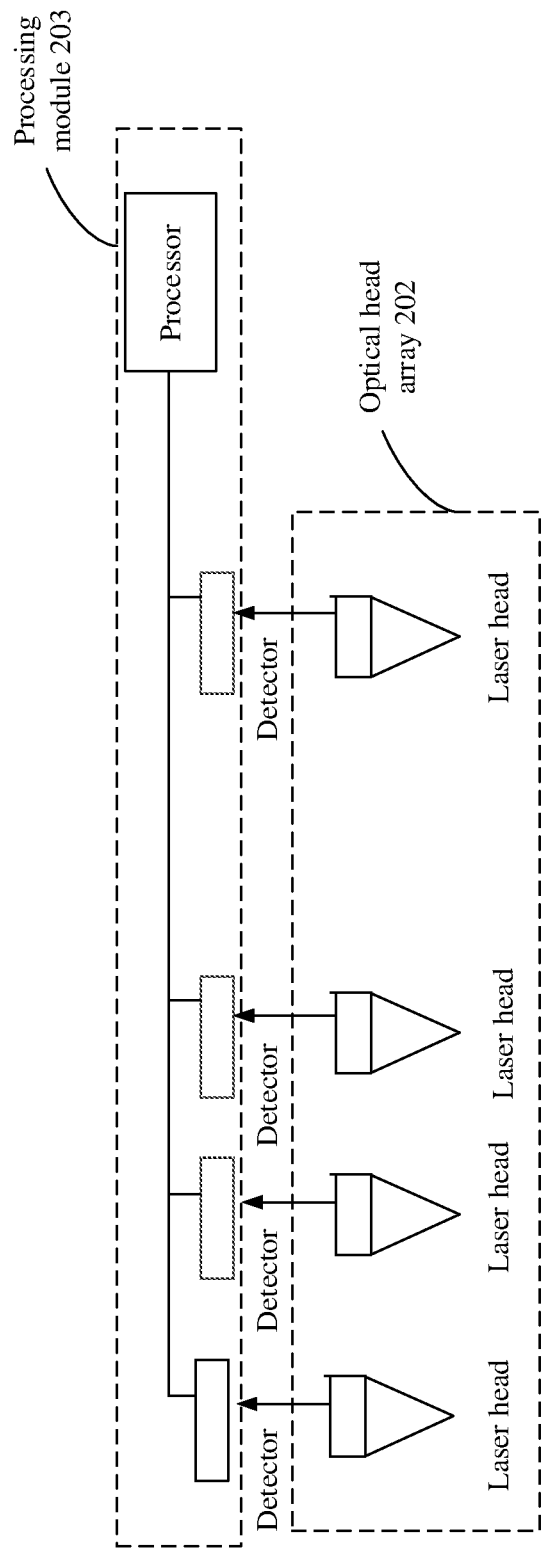
FIG. 7 is a schematic diagram of a structure of an example of a processing module according to an embodiment of this application.

In an example, referring to FIG. 7, the processing module 203 includes a plurality of detectors and a processor. Each detector is configured to detect one data signal obtained by one laser head. The processor is connected to the plurality of detectors, and is configured to obtain the data signal detected by each detector, and process the data signal detected by each detector, to obtain the read data.

Figure 8:
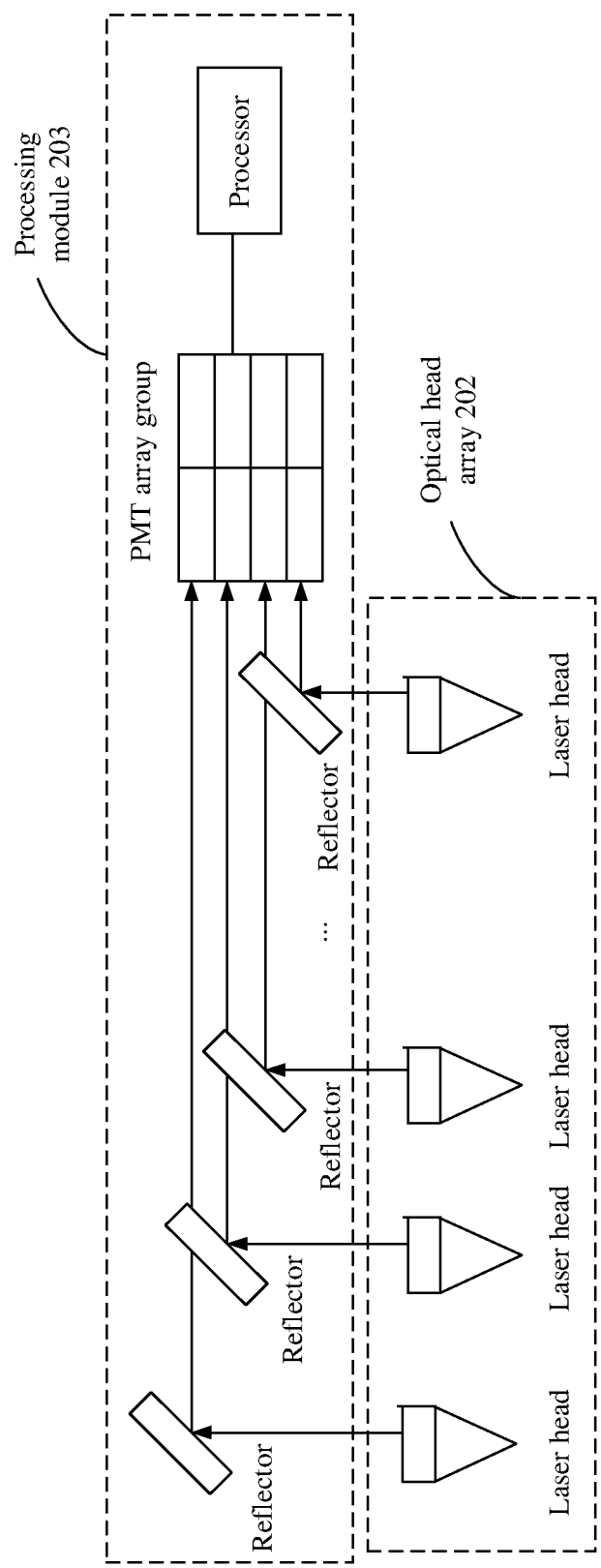
FIG. 8 is a schematic diagram of a structure of another example of a processing module according to an embodiment of this application.

In another example, referring to FIG. 8, the processing module 203 includes a plurality of reflectors, a plurality of detectors, and a processor. The plurality of reflectors one-to-one correspond to the plurality of laser heads in the optical head array 202, and are configured to reflect data signals obtained by the corresponding laser heads to the plurality of detectors. The plurality of detectors may be a photomultiplier tube (PMT) array group. The data signal obtained by each laser head is reflected to a preset position in the PMT array group. For example, the PMT array group includes eight PMTs, and the eight PMTs are arranged in an array of four rows and two columns. In this case, a data signal obtained by a first laser head is sent to a PMT located in a row 1 and a column 1 in the PMT array group by using a reflector corresponding to the first laser head, a data signal obtained by a second laser head is sent to a PMT located in a row 2 and the column 1 in the PMT array group by using a reflector corresponding to the second laser head, and so on. Finally, the PMT array group sends the plurality of data signals read this time to the processor, and the processor processes the plurality of data signals sent by the PMT array group, to obtain the read data.

In the foregoing data reading apparatus 200, the optical head array including the plurality of laser heads is disposed, so that a quantity of laser heads for reading data may be increased. In addition, the plurality of focal points is disposed in each laser head, so that in one data reading process, parallel reading of a plurality of pieces of data may be implemented by using the plurality of laser heads and the plurality of focal points, and a data read throughput of the optical storage medium may be improved.

Figure 9:
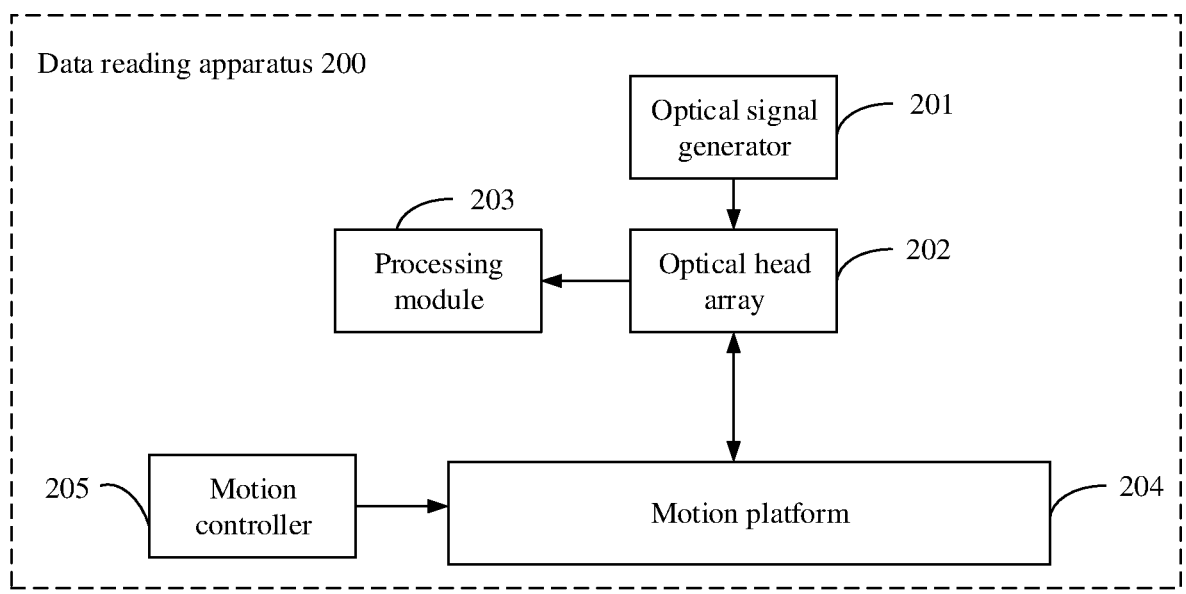
FIG. 9 is a schematic diagram of a structure of another example of a data reading apparatus according to an embodiment of this application.

In addition, if a data volume of to-be-read data is relatively large, the data reading apparatus 200 may need to perform reading for a plurality of times at a plurality of different positions of the optical storage medium. In this case, referring to FIG. 9, the data reading apparatus 200 may further include a motion platform 204 and a motion controller 205. The motion platform 204 is configured to place the optical storage medium. The motion controller 205 is connected to the motion platform 204, and is configured to control, based on a storage address of the read data, the optical storage medium to move, so that the data reading apparatus 200 obtains all content of the read data.

In this embodiment, unlike the servo 101 in the data reading/writing apparatus 100 shown in FIG. 1, the motion controller 205 does not control the optical storage medium to perform rotational motion, but controls the optical storage medium to move in a first direction and/or a second direction perpendicular to the first direction on the plane on which the optical storage medium is located. For example, a two-dimensional coordinate system is established by using the plane on which the optical storage medium is located as a reference plane. The first direction may be a direction in which an X axis of the two-dimensional coordinate system is located, and the second direction may be a direction in which a Y axis of the two-dimensional coordinate system is located. Therefore, the motion controller 205 may control the optical storage medium to move along the X axis or the Y axis on the reference plane. Because the optical storage medium does not need to perform rotational motion, complexity of controlling motion of the optical storage medium by the motion controller 205 may be reduced, and realizability of the motion controller 205 may be increased.

It should be noted that, to increase a volume of data that can be stored in the optical storage medium, in this embodiment, a shape of the optical storage medium may not be limited to a circle, for example, may include a polygon, for example, a rectangle or a triangle. For ease of description, the following uses an example in which the shape of the optical storage medium is a rectangle. In this case, a size of the rectangular optical storage medium may be determined based on the quantity of the plurality of laser heads included in the optical head array 202. For example, the rectangular optical storage medium may be partitioned, and each partition is a reading range corresponding to one laser head in the optical head array 202. Therefore, a quantity of partitions in the optical storage medium is the same as the quantity of laser heads included in the optical head array 202, thereby determining the size of the optical storage medium.

The following describes a motion control process of the optical storage medium by the motion controller 205. For ease of description, an example in which the first direction and the second direction are respectively the X axis and the Y axis of the two-dimensional coordinate system established by using the plane on which the optical storage medium is located as the reference plane is used. Based on a value relationship between the density of the plurality of focal points in the optical head array 202 and the density of the plurality of data points in the optical storage medium, the motion control process of the optical storage medium by the motion controller 205 is classified into the following two examples.

In a first example, the density of the plurality of focal points in the optical head array 202 is the same as the density of the plurality of data points in the optical storage medium. That is, an interval between two adjacent focal points in a laser head is the same as an interval between two adjacent data points in the optical storage medium. The motion control process of the optical storage medium by the motion controller 205 is as follows:

The motion controller 205 first controls the optical storage medium to move in the second direction with a first spacing as a step length. The first spacing is a spacing between adjacent data points. Then, when determining that the laser head of the optical head array 202 moves to the last row of data points of the optical storage medium in the direction, the motion controller 205 controls the optical storage medium to move in the first direction with a second spacing as a step length. The second spacing is a product of the spacing between adjacent data points and the quantity of the plurality of focal points included in the laser head. The foregoing motion control is repeated until the optical head array 202 obtains all content of the read data.

Figure 10:
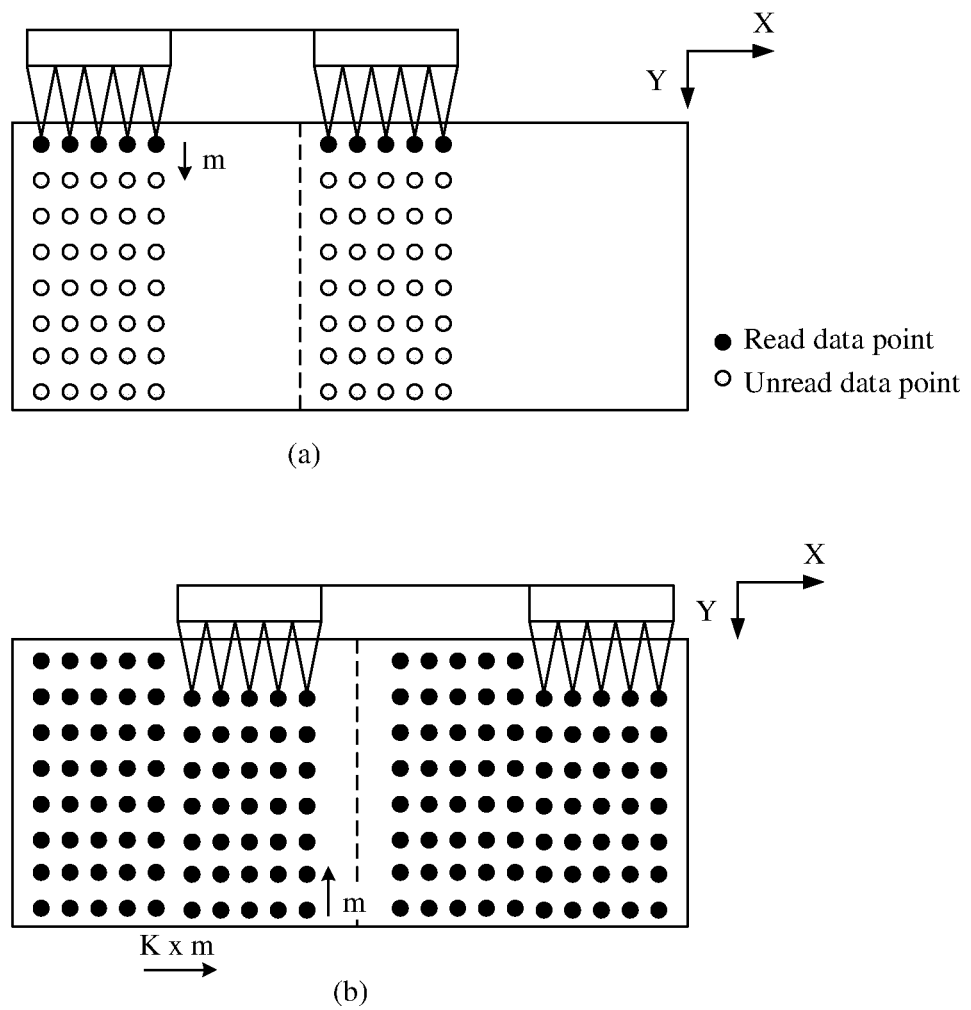
FIG. 10 is a schematic diagram of a first example of motion control performed on an optical storage medium by a motion controller according to an embodiment of this application.

For example, referring to FIG. 10, it is assumed that the interval between adjacent data points is m, the quantity of focal points included in each laser head is k, and the k focal points are arranged in one row and k columns. In this case, the motion controller 205 first controls the optical storage medium to move in a positive direction of the Y axis with a step length of m, as shown in (a) in FIG. 10. Then, after detecting that the optical head array 202 already moves to the last row of the optical storage medium on the Y axis, the motion controller 205 controls the optical storage medium to move along the X axis in a large range, that is, by k×m, and then move in a negative direction of the Y axis with the interval m as a step length, as shown in (b) in FIG. 10, until all content of the read data is obtained.

In a second example, the density of the plurality of data points in the optical storage medium is N times the density of the plurality of focal points in the optical head array 202.

That is, an interval between two adjacent focal points in a laser head is 1/N of an interval between two adjacent data points in the optical storage medium. The motion control process of the optical storage medium by the motion controller 205 is as follows:

The motion controller 205 first controls the optical storage medium to move in a positive direction of the second direction with a first spacing as a step length. The first spacing is a spacing between adjacent data points. Then, when determining that the laser head of the optical head array 202 moves to the last row of data points of the optical storage medium in the direction, the motion controller 205 controls the optical storage medium to move in the first direction by the first spacing; then controls the optical storage medium to move in a negative direction of the second direction with the first spacing as a step length, until the laser head of the optical head array 202 moves to the first row of data points of the optical storage medium in the second direction; and then controls the optical storage medium to move in the second direction with a third spacing as a step length. The third spacing is a sum of the spacing between adjacent data points and a first product, and the first product is determined based on N, the interval between adjacent data points, and the quantity of the plurality of focal points included in each reading/writing optical head. Then, the foregoing motion control is repeated until the optical head array 202 obtains all content of the read data.

Figure 11:
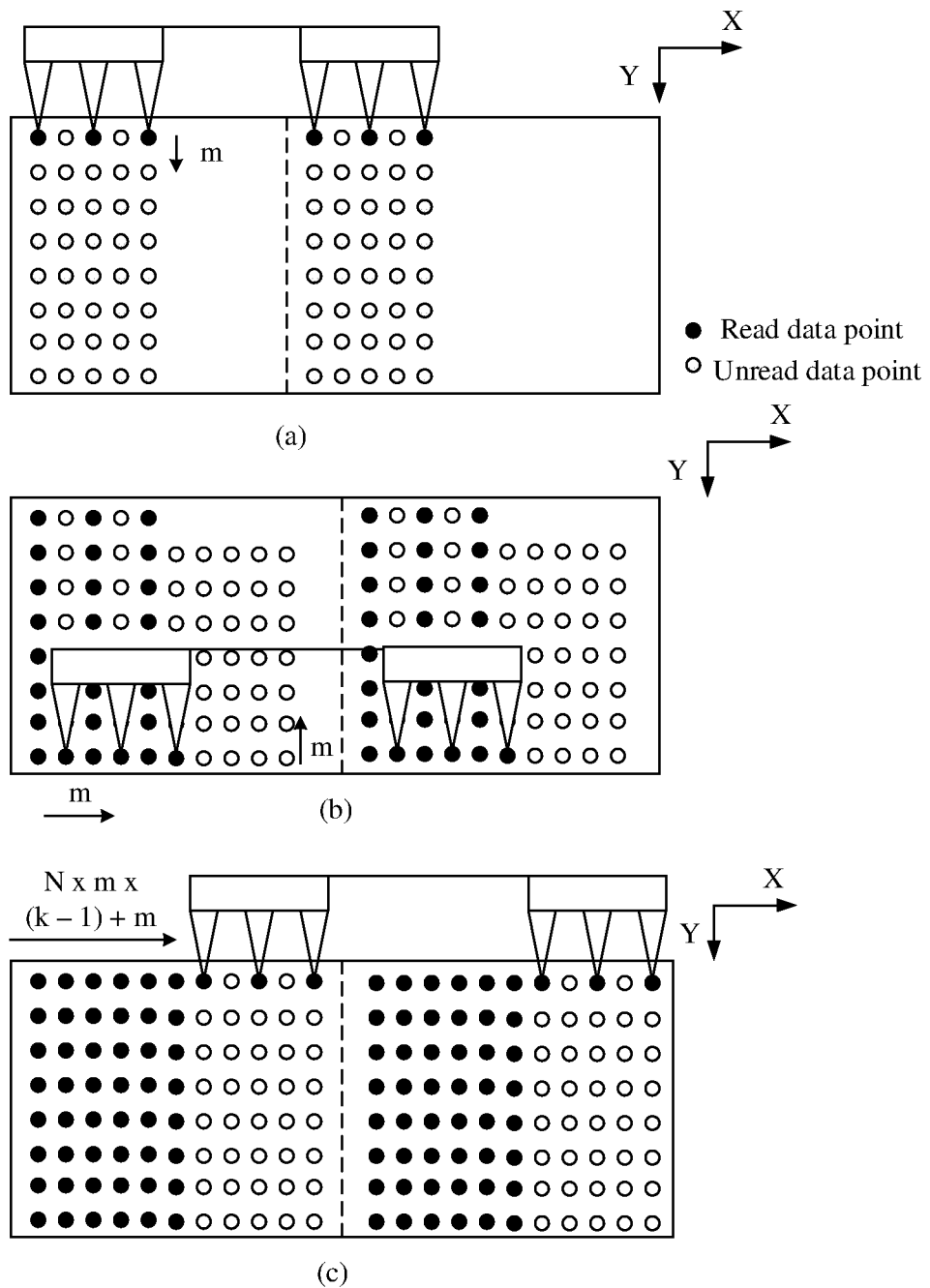
FIG. 11 is a schematic diagram of a second example of motion control performed on an optical storage medium by a motion controller according to an embodiment of this application.

For example, referring to FIG. 11, it is assumed that the interval between adjacent data points is m, the quantity of focal points included in each laser head is k, the interval between adjacent focal points is N×m, and the k focal points are arranged in one row and k columns. In this case, the motion controller 205 first controls the optical storage medium to move in a positive direction of the Y axis with a step length of m, as shown in (a) in FIG. 11. Then, after detecting that the optical head array 202 already moves to the last row of the optical storage medium on the Y axis, the motion controller 205 controls the optical storage medium to move in a positive direction of the X axis by m, as shown in (b) in FIG. 11. Then, the motion controller 205 controls the optical storage medium to move in a negative direction of the Y axis with the interval m as a step length, until the optical storage medium moves to the first row of data points on the Y axis. If content of the to-be-read data is not fully read, the motion controller 205 controls the optical storage medium to move along the X axis in a large range, that is, by N×m×(k−1)+m, as shown in (c) in FIG. 11. Then, the optical storage medium moves in the positive direction of the Y axis with a step length of m again. The foregoing motion control is repeated until the optical head array 202 obtains all content of the read data.

Certainly, if the optical storage medium has a plurality of layers, after all data at a current layer is read, the motion controller may further control the optical storage medium to move to a next layer to read data. A specific moving manner is similar to the foregoing content, and details are not described herein. In addition, when the plurality of focal points included in each laser head are arranged in a plurality of rows and a plurality of columns, a motion process of the optical storage medium is similar to the motion process in FIG. 10 or FIG. 11. Details are not described herein.

Figure 12:
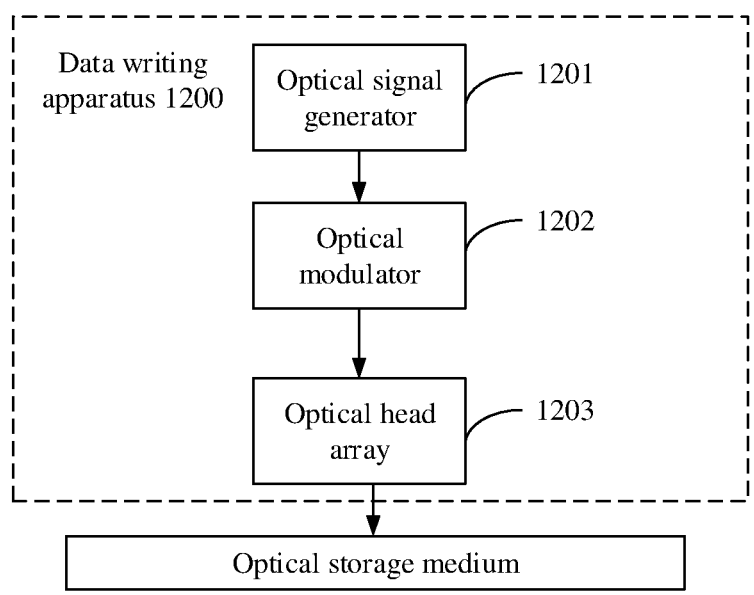
FIG. 12 is a schematic diagram of a structure of an example of a data writing apparatus according to an embodiment of this application.

Based on a same inventive concept, an embodiment of this application provides a data writing apparatus. FIG. 12 is a schematic diagram of a structure of a data writing apparatus 1200 according to an embodiment of this application. As shown in FIG. 12, the data writing apparatus 1200 includes an optical signal generator 1201, a plurality of optical modulators 1202, and an optical head array 1203. The optical signal generator 1201 is configured to generate an optical signal, and output the optical signal to the plurality of optical modulators 1202. After receiving the optical signal, each optical modulator 1202 modulates the optical signal based on to-be-stored data to obtain a plurality of modulated signals, and sends the obtained plurality of modulated signals to the optical head array 1203. After receiving the plurality of modulated signals, a plurality of laser heads included in the optical head array 1203 respectively controls, based on the received plurality of modulated signals, on/off of a plurality of focal points included in the corresponding laser heads, to write the to-be-stored data in parallel into an optical storage medium. One laser head in the optical head array 1203 may receive a plurality of modulated signals sent by one optical modulator 1202.

The foregoing briefly describes functions of the modules of the data writing apparatus 1200, and the following describes the modules in detail.

(1) Optical Signal Generator 1201

The optical signal generator 1201 is similar to the optical signal generator 201 in the data reading apparatus 200. Details are not described herein.

It should be noted that, in the data reading apparatus 200, the laser that is in the optical signal generator 201 and that is configured to generate laser light is a continuous laser, but a laser that is in the optical signal generator 1201 in this embodiment and that is configured to generate laser light is a pulsed laser, for example, a femtosecond laser.

(2) Plurality of Optical Modulators 1202

Figure 13:
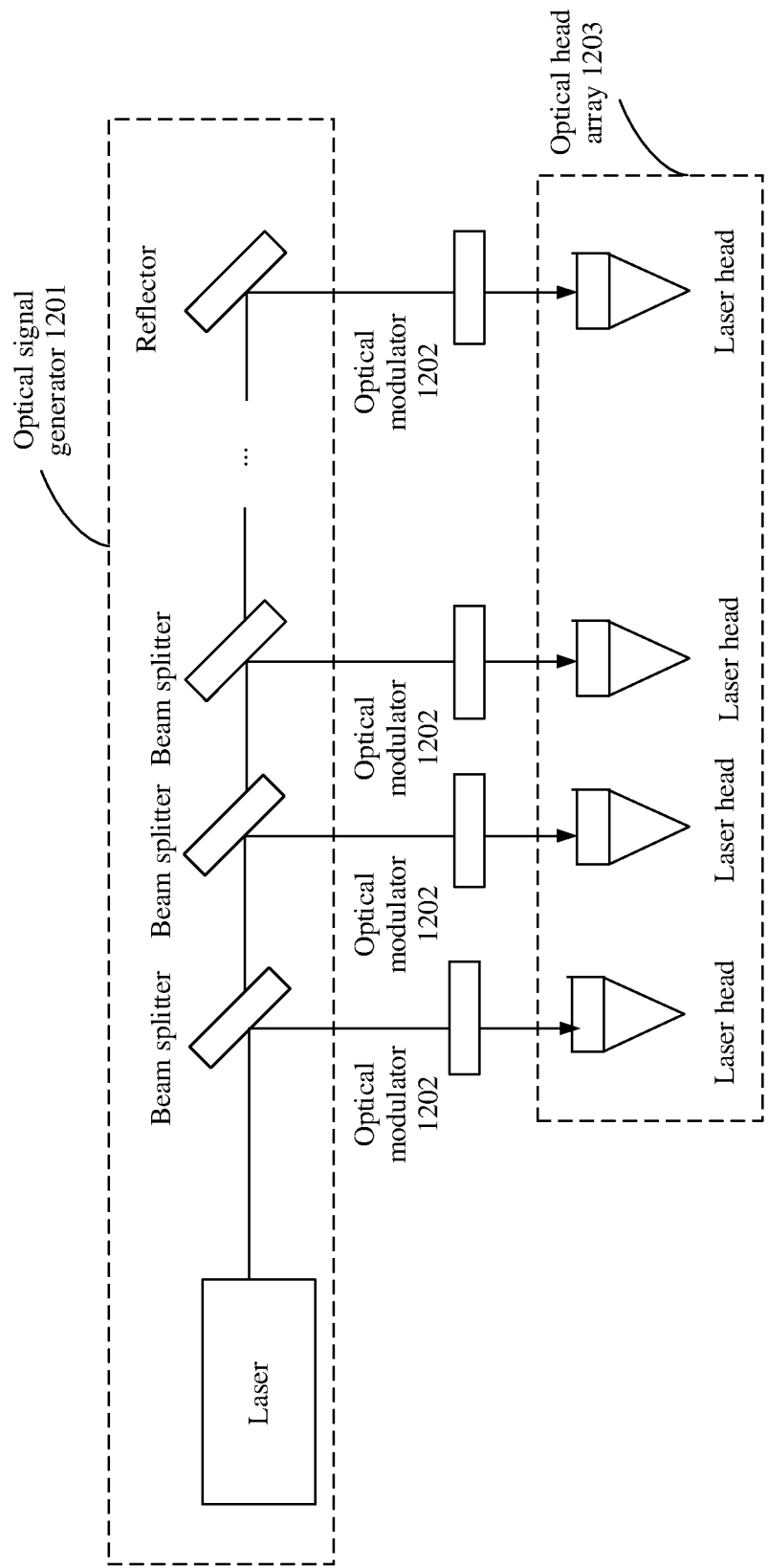
FIG. 13 is a schematic diagram of a structure of an example of a plurality of optical modulators according to an embodiment of this application.

In an example, FIG. 13 is a schematic diagram of an example of a plurality of optical modulators 1202. As shown in FIG. 13, there is a one-to-one correspondence relationship between the plurality of optical modulators 1202 and the plurality of laser heads in the optical head array 1203, and each optical modulator 1202 is disposed between one beam splitter of the optical signal generator 1201 and one laser head of the optical head array 1203. After the optical signal generator 1201 generates sub laser light by using the beam splitter, the optical modulator 1202 modulates the sub laser light based on the to-be-stored data to obtain one modulated signal corresponding to the optical modulator 1202. In this case, the optical modulator 1202 needs to store corresponding data in advance. For example, the plurality of optical modulators 1202 include eight optical modulators. In this case, the to-be-stored data needs to be divided into eight parts in advance, which are respectively stored in the corresponding optical modulators 1202.

Figure 14:
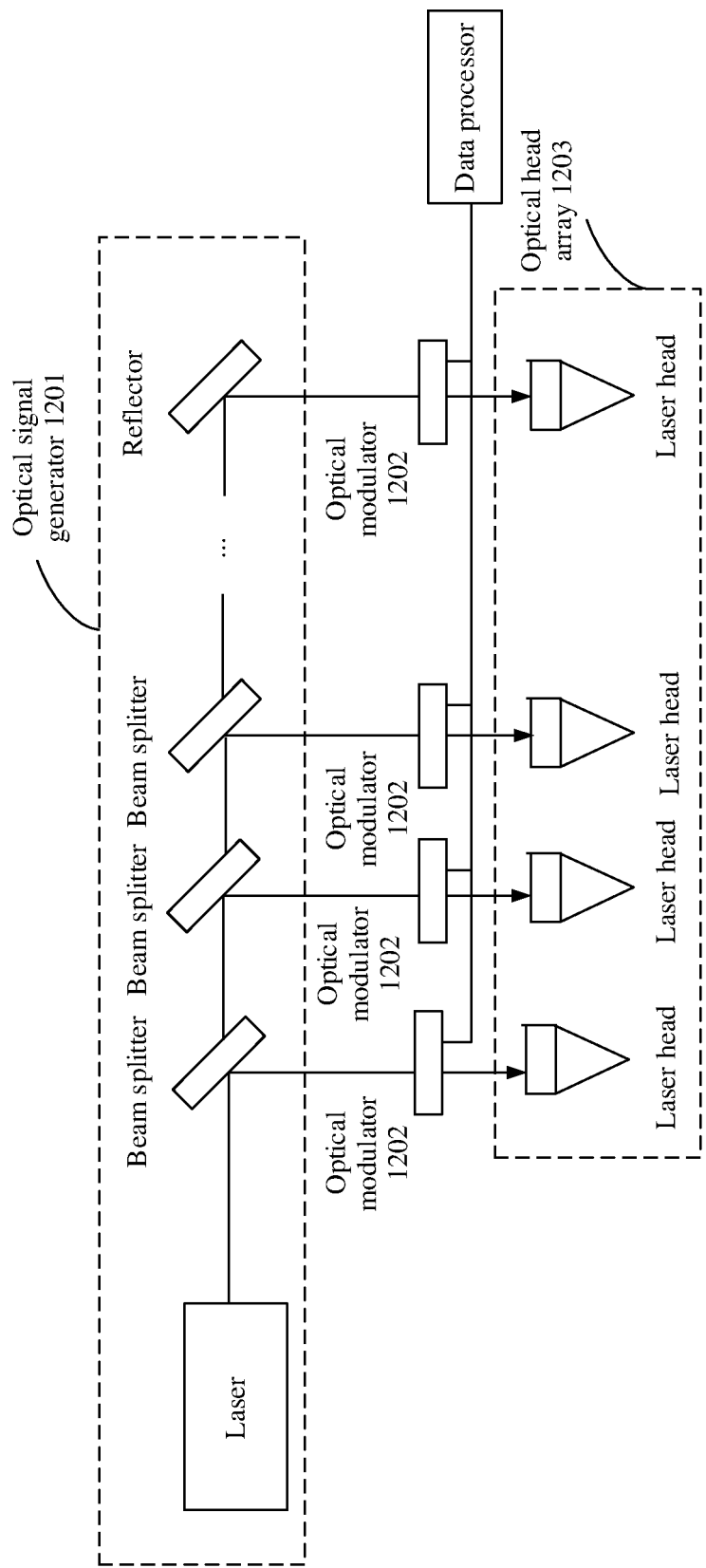
FIG. 14 is a schematic diagram of a structure of an example of a plurality of optical modulators and a data processor according to an embodiment of this application.

In another example, referring to FIG. 14, the plurality of optical modulators 1202 may be connected to a data processor. The data processor is configured to receive the to-be-stored data, divide the to-be-stored data into a plurality of parts, and send each part of data to a corresponding optical modulator 1202, so that received sub laser light is modulated by using the corresponding optical modulator, to obtain a corresponding modulated signal. In this way, the data processor divides the to-be-stored data, so that an automation degree of the data writing apparatus 1200 may be improved.

(3) Optical Head Array 1203

The optical head array 1203 is similar to the optical head array 202 in the data reading apparatus 200. Details are not described herein.

It should be noted that, in the data reading apparatus 200, on/off of the plurality of focal points of each laser head in the optical head array 202 may be uniformly controlled. For example, when data needs to be read, all focal points are controlled to be in an on state, and when data does not need to be read, all focal points are controlled to be in an off state. However, in this embodiment, on/off control of each focal point in the optical head array 1203 may be independent. For example, at a specific moment, some of a plurality of focal points in a laser head may be in an on state, the others may be in an off state, and on/off states of the plurality of focal points do not affect each other. Specifically, if data of a data point corresponding to a focal point is 0, the focal point may be controlled to be in the off state. If the data of the data point is 1, the focal point may be controlled to be in the on state. In this way, data may be written into the optical storage medium by controlling on/off states of a plurality of focal points.

In the foregoing data writing apparatus 1200, the optical head array including the plurality of laser heads is disposed, so that a quantity of laser heads for writing data may be increased. In addition, the plurality of focal points is disposed in each laser head, so that in one data writing process, parallel writing of a plurality of pieces of data may be implemented by using the plurality of laser heads and the plurality of focal points, and a data write throughput of the optical storage medium may be improved.

Similar to the data reading apparatus 200, the data writing apparatus 1200 may further include a motion platform 1204 and a motion controller 1205. The motion platform 1204 is configured to place the optical storage medium. The motion controller 1205 is connected to the motion platform 1204, and is configured to control, based on a storage address of the to-be-stored data, the optical storage medium to move, so that the data writing apparatus 1200 stores the to-be-stored data in the optical storage medium.

In this embodiment, the motion platform 1204 and the motion controller 1205 are similar to the motion platform 204 and the motion controller 205 in the data reading apparatus 200. Details are not described herein.

With reference to the foregoing embodiments, the following uses the data reading apparatus in the foregoing example as an example to describe a data reading method provided in an embodiment of this application.

Figure 15:
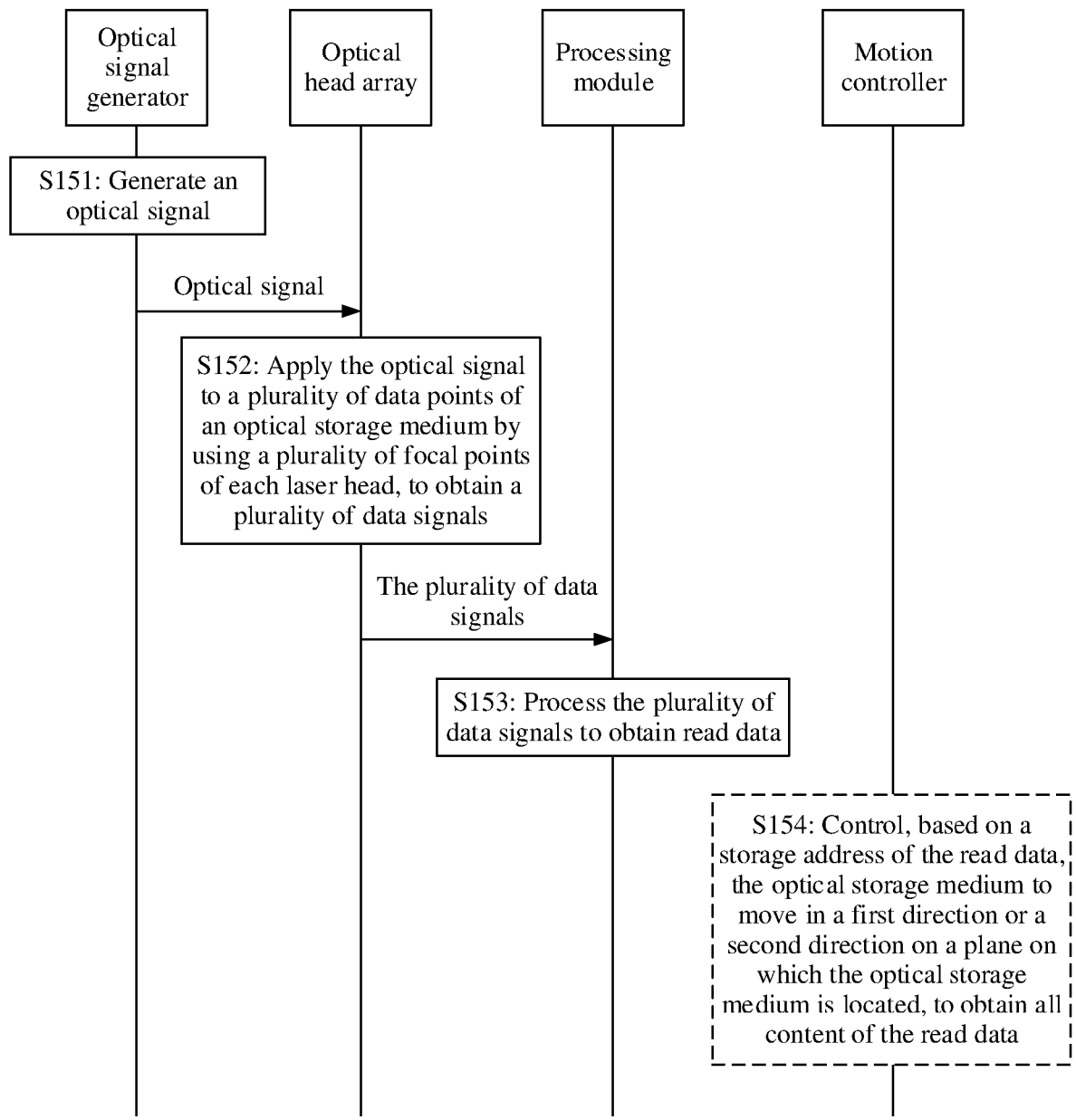
FIG. 15 is a flowchart of a data reading method according to an embodiment of this application.

FIG. 15 is a flowchart of an example of a data reading method according to an embodiment of this application. The flowchart is described as follows:

S151. An optical signal generator generates an optical signal.

For a process in which the optical signal generator generates the optical signal, refer to the foregoing description of the optical signal generator 201 in the data reading apparatus 200. Details are not described herein.

S152. A plurality of laser heads included in an optical head array receive the optical signal, and apply the optical signal to a plurality of data points of an optical storage medium by using a plurality of focal points of each laser head, to obtain a plurality of data signals.

In this embodiment, each laser head in the optical head array includes a plurality of focal points, and the optical signal is applied to the optical storage medium by using the plurality of focal points. For an arrangement manner of the laser heads in the optical head array, an arrangement manner of the plurality of focal points, and a process in which each laser head obtains a data signal, refer to the foregoing description of the optical head array 202 in the data reading apparatus 200. Details are not described herein.

S153. A processing module receives the plurality of data signals, and processes the plurality of data signals to obtain read data.

In an example, the processing module may receive and process the data signals by using a plurality of detectors and a processor that are included in the processing module. For example, the plurality of detectors may be connected to the processor, and each detector detects one data signal obtained by one laser head, so that after obtaining the data signal detected by each detector, the processor processes the data signal detected by each detector, to obtain the read data.

A structure of the processing module and a component included in the processing module are not limited herein. When the processing module includes another component, a processing manner of the processing module is similar to the foregoing content. For details, refer to the foregoing description of the processing module 203 in the data reading apparatus 200. Details are not described herein.

In an embodiment, if the data reading apparatus further includes a motion platform configured to place the optical storage medium and a motion controller, the method further includes:

S154. The motion controller controls, based on a storage address of the read data, the optical storage medium to move in a first direction or a second direction on a plane on which the optical storage medium is located, to obtain all content of the read data.

In this embodiment, the first direction is perpendicular to the second direction. For a manner in which the motion controller controls the optical storage medium and a process in which the data reading apparatus reads data in a moving process of the optical storage medium, refer to the foregoing descriptions of the motion platform 204 and the motion controller 205 in the data reading apparatus 200. Details are not described herein.

It should be noted that step S154 is an optional step, that is, step S154 is not mandatory to be performed. Therefore, in FIG. 15, step S154 is shown by dashed lines, to indicate that the step is an optional step.

With reference to the foregoing embodiments, the following uses the data writing apparatus in the foregoing example as an example to describe a data writing method provided in an embodiment of this application.

Figure 16:
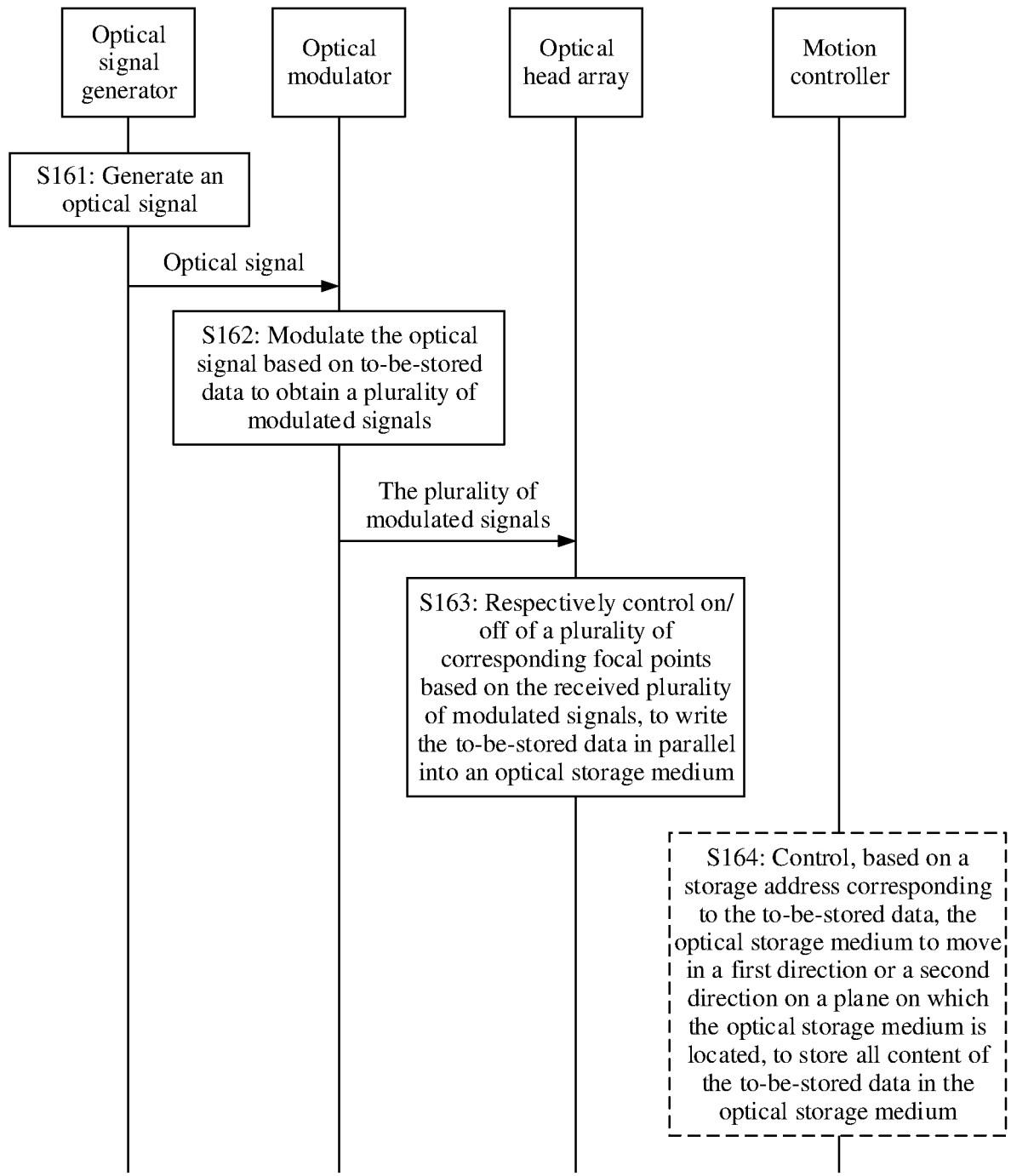
FIG. 16 is a flowchart of a data writing method according to an embodiment of this application.

FIG. 16 is a flowchart of an example of a data writing method according to an embodiment of this application. The flowchart is described as follows:

S161. An optical signal generator generates an optical signal.

For a process in which the optical signal generator generates the optical signal, refer to the foregoing description of the optical signal generator 1201 in the data writing apparatus 1200. Details are not described herein.

S162. Each of a plurality of optical modulators receives the optical signal, and modulates the optical signal based on to-be-stored data to obtain a plurality of modulated signals.

Each optical modulator may store the to-be-stored data in advance, so that after receiving the optical signal generated by the optical signal generator, the optical modulator may modulate the optical signal based on the to-be-stored data stored in advance. For a specific modulation process, refer to the foregoing description of the plurality of optical modulators 1202 in the data writing apparatus 1200. Details are not described herein.

S163. A plurality of laser heads included in an optical head array receives the plurality of modulated signals sent by the plurality of optical modulators, and respectively controls on/off of a plurality of corresponding focal points based on the received plurality of modulated signals, to write the to-be-stored data in parallel into an optical storage medium.

In this embodiment, each laser head includes a plurality of focal points, and one laser head receives a plurality of modulated signals sent by one optical modulator. It may be understood that there is a one-to-one correspondence relationship between the laser heads and the optical modulators, and each laser head may be configured to receive a plurality of modulated signals sent by an optical modulator corresponding to the laser head. For example, each laser head receives, based on a preset period, a plurality of modulated signals sent by the optical modulator corresponding to the laser head. A receiving manner is not limited herein. For a process in which the optical head array writes the to-be-stored data into the optical storage medium by using the plurality of focal points of each laser head, refer to the foregoing description of the optical head array 1203 in the data writing apparatus 1200. Details are not described herein.

In an embodiment, if the data writing apparatus further includes a motion platform configured to place the optical storage medium and a motion controller, the method further includes:

S164. The motion controller controls, based on a storage address corresponding to the to-be-stored data, the optical storage medium to move in a first direction or a second direction on a plane on which the optical storage medium is located, to store all content of the to-be-stored data in the optical storage medium.

In this embodiment, the first direction is perpendicular to the second direction. Step S164 is similar to step S154, and details are not described herein. In FIG. 16, step S164 is shown by dashed lines.

In the foregoing technical solutions, the optical head array including the plurality of laser heads is disposed, so that a quantity of laser heads for reading/writing data is increased. In addition, each laser head is improved, and the plurality of focal points are disposed in each laser head, so that in one data reading/writing process, parallel reading/writing of a plurality of pieces of data may be implemented by using the plurality of laser heads and the plurality of focal points in the laser head, and a data read/write throughput of the optical storage medium may be improved.

It should be noted that embodiments provided in this application are merely examples. A person skilled in the art may clearly know that, for convenience and conciseness of description, in the foregoing embodiments, embodiments emphasize different aspects, and for a part not described in detail in one embodiment, refer to related description of another embodiment. Features disclosed in embodiments, claims, and accompanying drawings of this application may exist independently or exist in a combination. Features described in a form of hardware in the embodiments of this application may be implemented by software, and vice versa. This is not limited herein.

What is claimed is:

1. A data reading apparatus, comprising:
an optical signal generator, configured to generate an optical signal;
an optical head array, comprising a plurality of laser heads, wherein each of the plurality of laser heads comprises a plurality of focal points, and the plurality of laser heads is configured to receive the optical signal, and apply the optical signal to a plurality of data points of an optical storage medium by using the plurality of focal points of each of the plurality of laser heads, to obtain a plurality of data signals;
a processing system, configured to receive the plurality of data signals, and process the plurality of data signals to obtain to-be-read data;
a motion platform, configured to place the optical storage medium; and
a motion controller, connected to the motion platform, and configured to control, based on a storage address of the data, the optical storage medium to move in a first direction or a second direction on a plane on which the optical storage medium is located, wherein the first direction is perpendicular to the second direction.

2. The data reading apparatus according to claim 1, wherein the plurality of laser heads comprises m rows and n columns of laser heads, wherein m and n are integers, and a product of m and n is not less than 2.

3. The data reading apparatus according to claim 1, wherein a shape of the optical storage medium comprises a rectangle.

4. The data reading apparatus according to claim 1, wherein the processing system comprises:
a plurality of detectors, wherein each of the plurality of detectors is configured to detect one data signal obtained by one laser head in the plurality of laser heads; and
a processor, connected to the plurality of detectors and configured to obtain the data signal detected by each of the plurality of detectors, and process the data signal detected by the detector, to obtain the data.

5. The data reading apparatus according to claim 1, wherein the optical signal is a continuous laser signal.

6. A data writing apparatus, comprising:
an optical signal generator, configured to generate an optical signal;
a plurality of optical modulators, wherein each of the plurality of optical modulators is configured to receive the optical signal, and modulate the optical signal based on to-be-stored data to obtain a plurality of modulated signals; and
an optical head array, comprising a plurality of laser heads, wherein each of the plurality of laser heads comprises a plurality of focal points; the plurality of laser heads is configured to receive a plurality of modulated signals sent by the plurality of optical modulators, and respectively control on/off of a plurality of corresponding focal points based on the received plurality of modulated signals, to write the to-be-stored data in parallel into an optical storage medium; and one laser head receives a plurality of modulated signals sent by one optical modulator;
a motion platform, configured to place the optical storage medium; and
a motion controller, connected to the motion platform, and configured to control, based on a storage address corresponding to the to-be-stored data, the optical storage medium to move in a first direction or a second direction on a plane on which the optical storage medium is located, wherein the first direction is perpendicular to the second direction.

7. The data writing apparatus according to claim 6, wherein the plurality of laser heads comprises m rows and n columns of laser heads, wherein m and n are integers, and a product of m and n is not less than 2.

8. The data writing apparatus according to claim 6, wherein the plurality of focal points of each laser head is located in a same row, and on/off control of each of the plurality of focal points is independent.

9. The data writing apparatus according to claim 6, wherein a shape of the optical storage medium comprises a rectangle.

10. The data writing apparatus according to claim 6, wherein the optical signal is a pulsed laser signal.

11. A data reading method, performed by a data reading apparatus, wherein the data reading apparatus comprises an optical signal generator, an optical head array, and a processing system, and the method comprises:
- generating, by the optical signal generator, an optical signal, wherein
- the optical head array comprises a plurality of laser heads, each of the plurality of laser heads comprises a plurality of focal points, and the plurality of laser heads is configured to receive the optical signal, and apply the optical signal to a plurality of data points of an optical storage medium by using the plurality of focal points of each laser head in the plurality of laser heads, to obtain a plurality of data signals; and
- receiving, by the processing system, the plurality of data signals, and processing the plurality of data signals to obtain to-be-read data,
- wherein the data reading apparatus further comprises a motion controller and a motion platform configured to place the optical storage medium, and the method further comprises:
- controlling, by the motion controller based on a storage address of the data, the optical storage medium to move in a first direction or a second direction on a plane on which the optical storage medium is located, wherein the first direction is perpendicular to the second direction.

12. The method according to claim 11, wherein the processing system comprises a plurality of detectors and a processor, and the method comprises:
- detecting, by each of the plurality of detectors, one data signal obtained by one laser head; and
- obtaining, by the processor, the data signal detected by each of the plurality of detectors, and processing the data signal detected by the detector, to obtain the data.

13. A data writing method, performed by a data writing apparatus, wherein the data writing apparatus comprises an optical signal generator, a plurality of optical modulators, and an optical head array, and the method comprises:
- generating, by the optical signal generator, an optical signal, wherein
- each of the plurality of optical modulators receives the optical signal, and modulates the optical signal based on to-be-stored data to obtain a plurality of modulated signals; and
- the optical head array comprises a plurality of laser heads; each of the plurality of laser heads comprises a plurality of focal points; the plurality of laser heads is configured to receive a plurality of modulated signals sent by the plurality of optical modulators, and respectively control on/off of a plurality of corresponding focal points based on the received plurality of modulated signals, to write the to-be-stored data in parallel into an optical storage medium; and one laser head receives a plurality of modulated signals sent by one optical modulator,
- wherein the data writing apparatus further comprises a motion controller, and a motion platform configured to place the optical storage medium, and the method further comprises:
- controlling, by the motion controller based on a storage address corresponding to the to-be-stored data, the optical storage medium to move in a first direction or a second direction on a plane on which the optical storage medium is located, wherein the first direction is perpendicular to the second direction.

* * * * *